E. GILBERT.
FARM GATE.
APPLICATION FILED MAY 16, 1910.
985,025.
Patented Feb. 21, 1911.
2 SHEETS—SHEET 1.
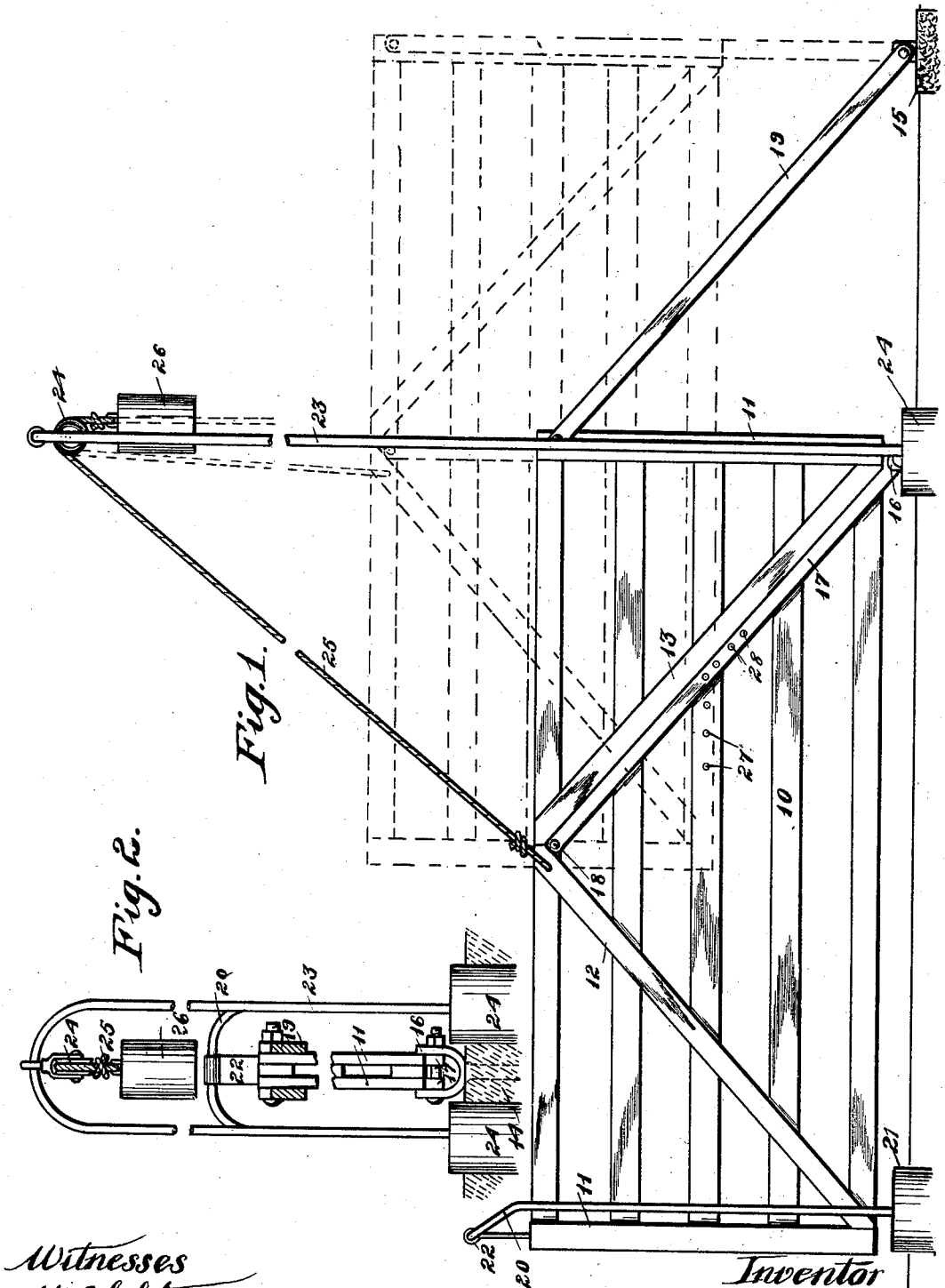
Witnesses
W. Aboftus.
A. G. Hague
Inventor
Emerson Gilbert
by J. Ralph Ensig Atty.

E. GILBERT.
FARM GATE.
APPLICATION FILED MAY 16, 1910.
985,025.
Patented Feb. 21, 1911.
2 SHEETS—SHEET 2.
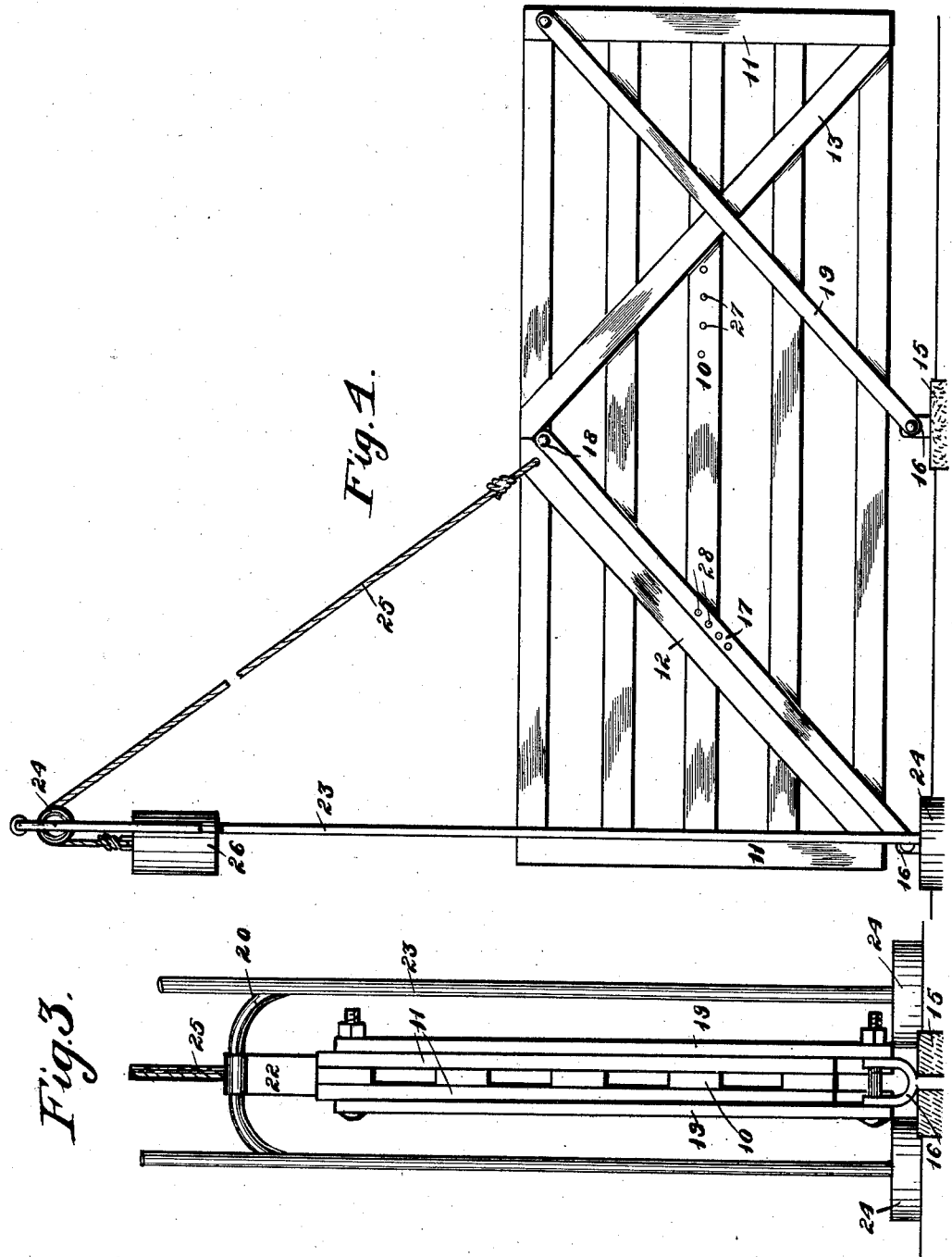
Witnesses
W. A. Softus.
A. G. Hague.
Inventor
Emerson Gilbert.
by J. Ralph Onwig Atty.

UNITED STATES PATENT OFFICE.

EMERSON GILBERT, OF ACKWORTH, IOWA.

FARM-GATE.

985,025.

Specification of Letters Patent.

Patented Feb. 21, 1911.

Application filed May 16, 1910. Serial No. 561,713.

*To all whom it may concern:*

Be it known that I, EMERSON GILBERT, a citizen of the United States, residing at Ackworth, in the county of Warren and State of Iowa, have invented a certain new and useful Farm-Gate, of which the following is a specification.

My invention relates to that class of farm gates in which the gate is supported to swing upwardly and outwardly away from the gate opening in a vertical plane.

My object is to provide a gate of this class in which the gate is firmly and securely supported in a position slightly elevated from the ground and in such a manner as to avoid strains upon the gate itself either when in its closed or in its open position, and further to provide improved means for supporting the gate and for counterbalancing the weight thereof so that it may be moved from one position to the other with a minimum of applied power.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a gate embodying my invention shown in closed position. The dotted lines thereof show the gate in its elevated position at the center of its movement. Fig. 2 shows a detail view, partly in section, to illustrate the means for supporting the weight or pulley and also the means for anchoring the gate supporting arms to the ground. Fig. 3 shows a rear end elevation of a gate embodying my invention, the upper end of the pulley supporting device and the pulley being omitted, and Fig. 4 shows a side elevation of my improved gate in open position.

Referring to the accompanying drawings, the gate proper is seen to be composed of a number of horizontally arranged gate members 10 rigidly connected at their ends by the upright gate members 11 secured to the sides of the parts 10. The said horizontally arranged gate members are further supported and connected with each other by means of flat wooden braces 12 and 13 on both sides of the gate members 10, the braces 12 being extended from the front lower corner of the gate upwardly to the top central portion of the gate, and the braces 13 being extended from the rear lower corner of the gate to the top central portion of the gate, both of these braces at each side of the gate being secured to the sides of the horizontally arranged gate members 10.

In order to support the gate, I provide two posts 14 and 15 each of which is preferably formed of concrete and extended only a slight distance above the ground level and each has embedded in it a metallic fork 16, one of the forks 16 being directly under the rear corner of the gate when in its closed position and the other being directly under the center of the gate when in its open position. Pivotally connected to the fork 16 in the post 14 are two supporting arms 17, which arms are spaced apart from each other a distance corresponding to the thickness of the gate members 10 and the upper ends of these arms 17 are pivotally connected with the top rail of the gate below the adjacent ends of the braces 12 and 13 by means of the bolt 18.

Supporting arms 19 are pivoted to the fork 16 in the post 15 and are spaced apart from each other a distance corresponding to the thickness of the gate at the point where the uprights 11 overlap the horizontal gate members 10 so that the entire gate may freely move between the arms 19. Said arms 19 are extended exactly parallel with the arms 17 and are pivoted at their upper ends to the top gate member at the rear of the gate as clearly shown in Fig. 1. By means of this arrangement I accomplish the following desirable results: When the gate is in its closed position, as shown in Fig. 1, the gate supporting braces 13 rest upon the supporting arms 17 throughout their entire length and thus the weight of the gate is distributed evenly throughout the length of the supporting arms 17. The supporting arms 19 tend to hold the gate firmly in position with the braces 13 against the arms 17 so that the entire gate will be supported a slight distance above the ground surface and the strains on the gate will be distributed throughout the entire length of the braces 13 on both sides of the gate. Then when the gate is moved to open position the braces 12 will engage the supporting arms 17 as shown in Fig. 4 and the gate will also be supported in a position elevated above the ground with the strains distributed throughout the entire length of the braces 12, as clearly shown in Fig. 4, so that whether the gate is either open or closed it will be firmly and immovably supported and the strains upon it will be evenly distributed throughout the entire gate.

In order to prevent lateral movement of the gate when in its closed position and also in order to prevent it from being raised, I have provided a metal rod 20 doubled at its central portion and having its ends inserted in concrete posts 21. The top of the rod 20 is substantially horizontal, as shown in Fig. 3, and pivoted to this part is a latch device 22 which extends straight downwardly and is free to swing in a plane longitudinally of the gate. It is of such length that when the gate is in its closed position it will rest on top of the gate and prevent the gate from being elevated.

In order to open the gate it is necessary for the operator to grasp the latch 22 and swing it toward the center of the gate, whereupon the gate may easily be elevated. Then when the gate is moved to closed position it will strike the latch 22 and swing it outwardly and then when the gate reaches its closed position, the latch 22 will move by gravity to position above the gate. The sides of the rod 20 also serve to limit any lateral movement of the gate when in its closed position.

In order to provide for counterbalancing the weight of the gate so that it may rest easily when at either limit of its movement, I have provided an upright consisting of a bar 23 doubled at its central portion and having its ends inserted in concrete posts 24 arranged on opposite sides of the rear end of the gate when in its closed position as shown in Fig. 1. At the top of the upright 23 is a swiveled pulley 24 and a rope or cable 25 is attached at one end to the central portion of the gate and passed over said pulley and provided with a weight 26 at its other end. By this arrangement the weight of the gate itself is almost balanced by that of the weight 26 so that in order to swing the gate to open position it is only necessary for the operator to raise a slight portion of the weight of the gate by hand. When the gate moves to open position it will first swing upwardly to its center of movement to the position indicated by dotted lines in Fig. 1, and during this time the weight 26 will aid in elevating the gate. Then when the gate moves beyond this point the swiveled pulley 24 will turn on its swivel and the weight 26 will tend to retard the further movement of the gate so that it will swing to its open position, as shown in Fig. 4, against the counterbalancing weight 26. By providing a swiveled pulley for the rope 25 I avoid all danger of having the rope or cable 25 become caught or entangled in the pulley or weight as the pulley will at all times turn around to position with the gate on one side and the pulley on the other when the gate swings to either its open or its closed position or vice versa. I have also provided means by which the gate may be supported in a slightly elevated position so that hogs or other small animals may pass under it while the gate at the same time may be made to exclude horses and cattle and larger animals. For this purpose I provide a series of openings 27 in the central horizontal gate member 10 and also a series of openings 28 in the supporting arms 17. I also incline the top portion of the rod 20 outwardly away from the gate so that when the gate is slightly elevated the rod 20 will prevent lateral movements thereof and at the same time the gate may be raised upwardly and rearwardly away from the upper portion of the rod 20. When it is desired to support the gate in a partially elevated position the operator raises it a short distance in the manner before described and then inserts a pin through one of the openings 28 and one of the openings 27, thus firmly holding the gate in said partially elevated position and when in said position the gate will be prevented from moving laterally by the sides of the rod 20.

I claim as my invention:

1. An improved farm gate, comprising horizontally and vertically arranged gate members fixed together, braces on said gate members extending from the lower end portions of the gate toward the central upper portion of the gate, and supporting arms pivotally connected at their lower ends to a stationary support, one of them being pivotally connected at its upper end to the gate between the upper ends of said braces and the other being pivotally connected at its upper end to the gate near its top, said supporting arms being arranged in parallel positions and said parts being so arranged and proportioned that one of the said braces will engage and rest upon one of the supporting arms when the gate is in its closed position and when the gate is in its open position, the other one of said braces will engage and rest upon the same supporting arm, for the purposes stated.

2. In a farm gate, the combination of horizontal gate members, upright gate members connected therewith, braces on both sides of the horizontal gate members extended from the lower corners of the gate to the upper central portion of the gate on both sides, two pairs of supporting arms pivoted to stationary supports at their lower ends, one pair being on opposite sides of the gate and being pivoted at their upper ends to the central portion of the gate between the upper ends of said braces and being spaced apart far enough to permit the said braces to rest on the said supporting arms when the gate is either in its open or its closed position, the second pair of supporting arms being pivoted at their upper ends to the gate and being arranged parallel with the first pair of supporting arms.

3. In a farm gate, the combination of horizontal gate members, upright gate members connected therewith, braces on both sides of the horizontal gate members extended from the lower corners of the gate to the upper central portion of the gate on both sides, two pairs of supporting arms pivoted to stationary supports at their lower ends, one pair being on opposite sides of the gate and being pivoted at their upper ends to the central portion of the gate between the upper ends of said braces and being spaced apart far enough to permit the said braces to rest on the said supporting arms when the gate is either in its open or its closed position, the second pair of supporting arms being pivoted at their upper ends to the gate and being arranged parallel with the first pair of supporting arms, the supporting arms that are connected to the central portion of the gate being provided with a series of openings near their central portions and one of the horizontal gate members being also provided with a series of openings for the purpose of receiving a pin for supporting the gate at different positions of elevation, for the purposes stated.

Des Moines, Iowa, April 19, 1910.

EMERSON GILBERT.

Witnesses:
 LOUIE OVERTON,
 I. M. PEEK.